United States Patent
Howard et al.

(10) Patent No.: US 12,433,648 B1
(45) Date of Patent: Oct. 7, 2025

(54) PHYSEAL TETHERING DEVICE WITH NON-INVASIVE UNLOCKING APPARATUS FOR CESSATION OF GUIDED GROWTH MODULATION

(71) Applicants: Jason James Howard, Wilmington, DE (US); Christopher Kennedy, San Jose, CA (US)

(72) Inventors: Jason James Howard, Wilmington, DE (US); Christopher Kennedy, San Jose, CA (US)

(*) Notice: Subject to any disclaimer, the term of this patent is extended or adjusted under 35 U.S.C. 154(b) by 578 days.

(21) Appl. No.: 17/743,777

(22) Filed: May 13, 2022

Related U.S. Application Data

(60) Provisional application No. 63/258,549, filed on May 13, 2021.

(51) Int. Cl.
*A61B 17/80* (2006.01)
*A61B 17/064* (2006.01)
(Continued)

(52) U.S. Cl.
CPC ...... *A61B 17/8004* (2013.01); *A61B 17/8023* (2013.01); *A61B 17/8057* (2013.01); *A61B 17/0642* (2013.01); *A61B 17/155* (2013.01); *A61B 17/1707* (2013.01); *A61B 17/1764* (2013.01); *A61B 2017/564* (2013.01); *A61B 17/7016* (2013.01); *A61B 17/7059* (2013.01);
(Continued)

(58) Field of Classification Search
CPC .............. A61B 17/808; A61B 17/8061; A61B 17/8625; A61B 17/80; A61B 17/82; A61B 17/88; A61B 17/7059; A61B 17/1739; A61B 17/1764; A61B 17/155; A61B 17/0642; A61B 17/8028; A61B 17/8052; A61B 17/8004; A61B 17/8023; A61B 17/8057; A61B 17/8019; A61B 17/1707; A61B 17/7016; A61B 2017/564; A61B 2050/0079; Y10S 606/902; Y10S 606/915
USPC .... 606/280, 281, 298, 86 R, 86 B, 291, 286, 606/71, 282, 76, 87, 88, 105, 902
See application file for complete search history.

(56) References Cited

U.S. PATENT DOCUMENTS

2018/0360497 A1* 12/2018 Strozyk ................ A61B 17/663

OTHER PUBLICATIONS

Kadhim, et al., The "Sleeper" Plate: A Technical Note, J Limb Length Recon, Jan.-Jun. 2019; vol. 5(1): 27-32.
(Continued)

*Primary Examiner* — Marcela I. Shirsat
(74) *Attorney, Agent, or Firm* — Avek IP, LLC; Marshall Honeyman

(57) ABSTRACT

The present disclosure is directed to a system for guided growth where the implanted physeal tether device can be unlocked using a non-invasive, transcutaneous technique. In one embodiment, a guided growth implant device, consisting of at least two locked pieces at time of surgical implant, can be non-surgically unlocked in-situ, thus halting the guided growth process on demand without requiring additional surgery. In another embodiment, a guided growth implant device can be unlocked using a magnetic or electromagnetic coupling technique. In another embodiment, a guided growth system consists of a device that is implanted to constrain/tether physeal growth and an external actuator tool that is used to non-invasively, non-surgically unlock the implanted device thus halting the guided growth process.

20 Claims, 14 Drawing Sheets

(51) Int. Cl.
    *A61B 17/15*         (2006.01)
    *A61B 17/17*         (2006.01)
    *A61B 17/56*         (2006.01)
    *A61B 17/70*         (2006.01)
    *A61B 17/86*         (2006.01)
    *A61B 50/00*         (2016.01)

(52) U.S. Cl.
    CPC ....... *A61B 17/8019* (2013.01); *A61B 17/8028* (2013.01); *A61B 17/8052* (2013.01); *A61B 17/8061* (2013.01); *A61B 17/8625* (2013.01); *A61B 2050/0079* (2016.02); *Y10S 606/902* (2013.01); *Y10S 606/915* (2013.01)

(56) References Cited

OTHER PUBLICATIONS

Gerges et al., Efficacy and Safety of "Sleeper Plate" in Temporary Hemiepiphysiodesis and the Observation of "Tethering", J Pediatr Orthop., Aug. 2022, vol. 42(7): e762-e766.

\* cited by examiner longitudinal axis

Fig. 4A
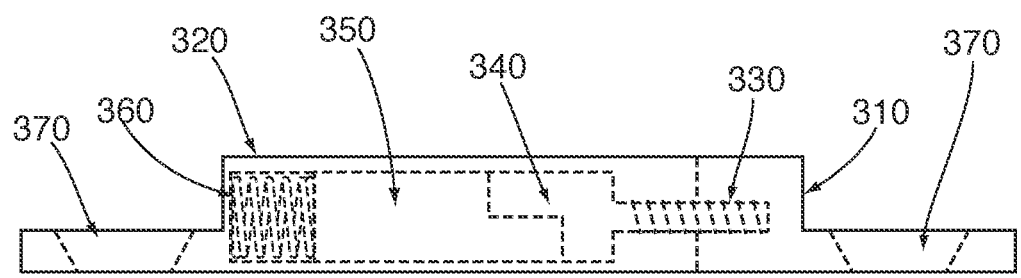
longitudinal axis
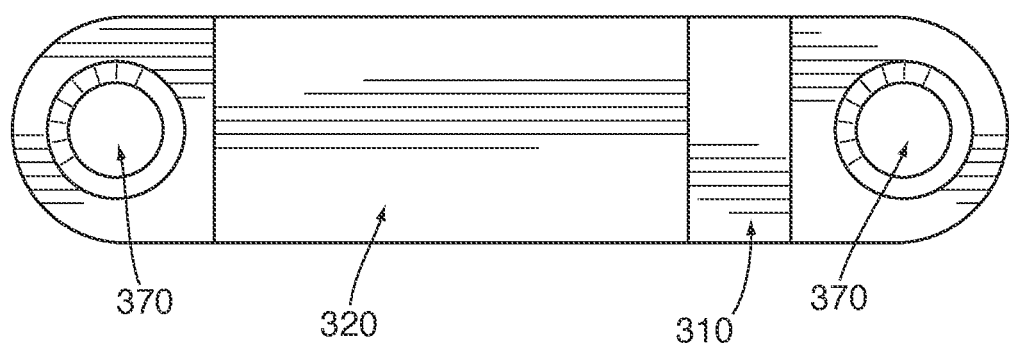
Fig. 4B

Fig. 9A
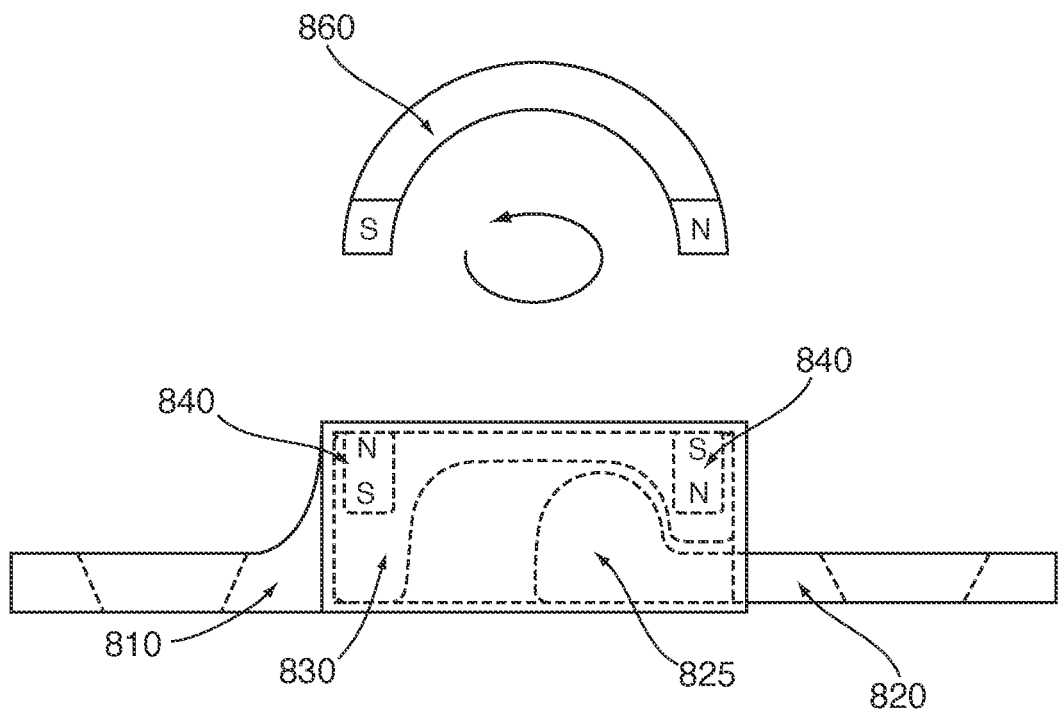
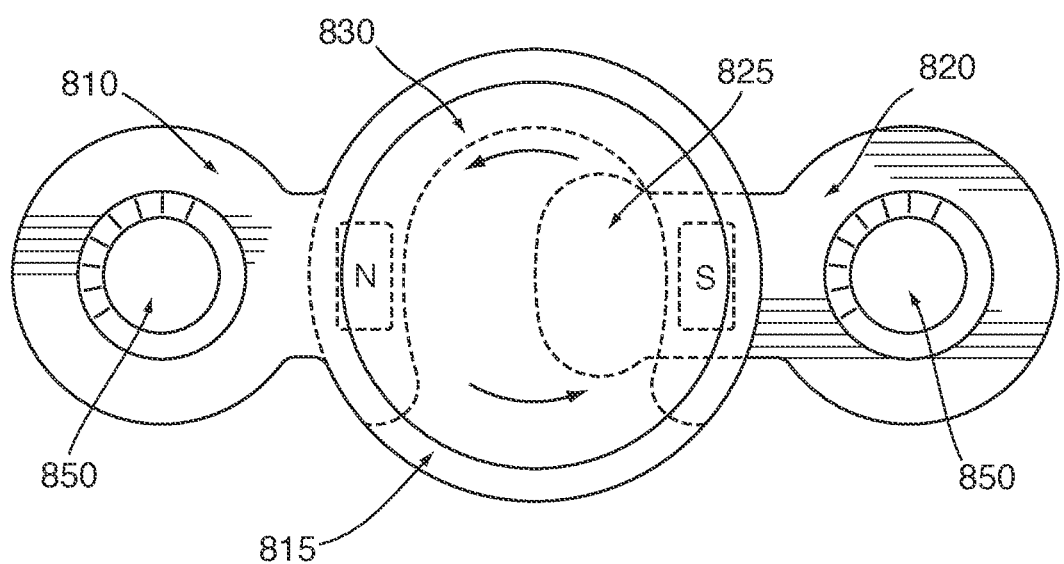
Fig. 9B

PHYSEAL TETHERING DEVICE WITH NON-INVASIVE UNLOCKING APPARATUS FOR CESSATION OF GUIDED GROWTH MODULATION

CROSS-REFERENCE TO RELATED APPLICATION

This application claims the benefit of and priority to U.S. Provisional Patent Application No. 63/258,549 filed May 13, 2021, the contents of which are incorporated herein by reference in their entirety.

FIELD OF THE DISCLOSURE

The present disclosure is directed to a system for guided growth in long bones wherein an implanted device can be unlocked using a non-invasive, transcutaneous technique.

BACKGROUND

Guided growth systems are employed for the purpose of modulating the growth of long bone(s). These systems are useful for gradually correcting angular growth deformities in growing children by tethering the physis or growth plate. Specific conditions/diseases for which guided growth will be indicated include: valgus, varus or flexion, extension deformities of the knee (femur and/or tibia); valgus, varus, or plantar flexion deformities of the ankle; valgus or varus deformities of the elbow (humerus); and radial or ulnar deviation, flexion or extension deformities of the wrist (radius). Guided growth systems can also be utilized to correct limb length discrepancies, typically up to 5 cm.

Guided growth techniques which achieve both complete epiphysiodesis (i.e., both sides of the physis is tethered) or hemiepiphysiodesis (i.e., one side of the physis is tethered) are employed to correct angular deformities and limb length discrepancies, respectively, in skeletally immature patients. The use of guided growth provides alternative techniques to corrective osteotomies that can be performed in a minimally invasive manner, resulting in less pain, shorter immobilization time, decreased cost, and less surgical risk.

Metal implants such as Blount staples and screw-plate systems (e.g., Eight Plate®, Pediplate®, Hinge Plate™) are examples of physeal tethering devices surgically implanted to guide growth. In most cases, a second surgery is required to halt the guided growth process by removing the implanted device, allowing growth to resume after the deformity has been corrected. This requirement exposes the patient to substantial risk, most notably infection, wound dehiscence, and scarring, in addition to the risk of general anesthesia. There is also a risk of injury to the physis during implant removal, which may lead to an irreversible physeal tether and recurrence of deformity.

For children within two years of skeletal maturity, a permanent hemiepiphysiodesis or complete epiphysiodesis can been utilized to achieve angular correction of limb deformity or to normalize limb length inequality, respectively, without the need for surgical implants. These procedures, however, are irreversible and require precise timing to achieve full deformity correction without causing overcorrection into a reverse deformity.

SUMMARY

The disclosure relates to a surgically implanted device which acts as a physeal tether, guiding the growth of long bones to achieve correction of angular limb deformity correction and/or limb length discrepancy. The device can be unlocked transcutaneously through a magnetic coupling between the implanted device and an external actuator which applies the affecting magnetic field, allowing the resumption of normal growth without surgical removal of the tethering device.

In one embodiment of the present disclosure, the device consists of at least two pieces, which are locked to one another at time of implant, which can be unlocked and released transcutaneously, allowing for the resumption of normal physeal growth.

In another embodiment, the device utilizes a screw connecting the two device halves, which can be unscrewed transcutaneously using a magnetic field generated from a permanent magnet or electromagnet via an external apparatus, thus releasing the two halves allowing for the resumption of normal physeal growth.

In another embodiment, the device utilizes a cam mechanism which can be unlocked transcutaneously using a magnetic field generated from a permanent magnet or electromagnet via an external apparatus, thus releasing the two halves allowing for the resumption of normal physeal growth.

In another embodiment, the device utilizes a worm gear, which can be rotated transcutaneously using a magnetic field generated from a permanent magnet or electromagnet via an external apparatus, thus releasing the two halves allowing for the resumption of normal physeal growth.

In another embodiment, the device utilizes a 'dog' that can be rotated using a magnetic field—generated from a permanent magnet or electromagnet—via an external apparatus, releasing the constraint on a ratcheted, serrated locking bar, allowing for the resumption of normal physeal growth.

In other embodiments, screw fixation is utilized to anchor the implant to the bone. In other embodiments, staple fixation is utilized to anchor the implant to the bone.

In other embodiments, the device is hinged, facilitating the device consisting of at least two pieces to bend during bone growth.

In an embodiment, the disclosure provides a guided bone growth plate for tethering the physis of a subject, comprising
  at least two plate segments, each plate segment attachable to bone;
  the guided bone growth plate having
  (i) a locked position in which the plate segments are connected by a connector mechanism (releasable connector mechanism) so that the plate segments are in fixed, spaced apart relation along a longitudinal axis, the plate segments tethering the physis to reduce physeal bone growth; and
  (ii) an unlocked position in which the plate segments are disconnected and permitted to move apart along the longitudinal axis in response to bone growth;
  a magnetically responsive driver on at least one of the plate segments, the driver capable of being actuated by application of magnetic force to the driver to disconnect the connector mechanism to change the plate from the locked position to the unlocked position.

Another embodiment of the disclosure provides a guided bone growth plate for tethering the physis of a subject, comprising
  at least two plate segments, each plate segment having a bone contact surface and an attachment portion for attachment of each plate to bone;

a releasable connector mechanism associated with the plate segments that releasably connects and locks the plate segments together, the connector mechanism comprising:
- an engagement surface on at least one of the plate segments;
- a lock having at least one locking surface corresponding to an engagement surface, the lock having a locked position in which the locking surface engages the corresponding engagement surface so that the plates are connected in fixed, spaced apart relation along a longitudinal axis, and an unlocked position in which the locking surface and the engagement surface are disengaged so that the plates are disconnected and permitted to move along the longitudinal axis in response to bone growth;
- a magnetically responsive driver associated with the connector mechanism, the driver capable of being actuated by application of magnetic force to the driver, the actuation of the driver causing the locking surface to disengage from the engagement surface, thereby actuating the lock from the locked position to the unlocked position.

wherein in the locked position, when the bone contact surfaces contact bone and the bone plate segments are attached to bone at bone attachment sites, the guided bone growth plate tethers the physis and reduces longitudinal bone growth between the attachment sites.

The attachment portion optionally comprises a hole on each plate, optionally a tapered hole, optionally a threaded hole. The magnetically responsive driver is optionally located within the connector mechanism. The magnetically responsive driver optionally comprises: i) a worm gear and/or ii) one or more intermediate gears; the driver capable of being actuated by application of magnetic force to the driver, the actuation of the driver actuating the worm gear or the one or more intermediate gears, causing the locking surface to disengage from the engagement surface, thereby actuating the lock from the locked position to the unlocked position. The plate segments optionally comprise a first plate segment and a second plate segment. The releasable connector mechanism optionally comprises a screw or a pin. The releasable connector mechanism optionally comprises a screw with first and second ends, the first screw end contained in the first plate, and the second screw end threadably receivable in a respective second screw hole in the second plate. The first screw end is optionally threadably receivable in a respective first threaded screw hole in the first plate. The first end of the screw optionally provides a first threaded engagement surface suitable for threadedly engaging the first locking surface of the first threaded screw hole, and second end of the screw provides a second threaded engagement surface suitable for threadedly engaging the second locking surface of the second threaded screw hole. The driver optionally comprises a magnet integrated within the screw.

The magnet is optionally cylindrical and is approximately the same diameter and length as the screw and is i) diametrically polarized, or ii) axially polarized. The magnet optionally comprises a negative pole and a positive pole, and wherein the poles are parallel to the at least two plate segments. The magnet optionally comprises a negative pole and a positive pole, and wherein the poles are oriented orthogonal to the at least two plate segments.

The attachment portion optionally comprises a hole that is configured for receiving an attachment screw or a staple to attach the plate to bone. The releasable connector mechanism optionally comprises a serrated locking bar and a dog comprising serrated feet contained in the first plate, wherein the serrated feet of the dog are engageable with the serrated locking bar. The dog is optionally anchored by a torsion spring and a fulcrum. The dog is optionally rotatable by a magnetic field from an external apparatus. In an embodiment, when the dog is rotated in a first direction, the serrated feet of the dog are engaged with the serrated locking bar, and when the dog is rotated in a second direction, the serrated feed of the dog are disengaged from the serrated locking bar. In an embodiment, when the dog is rotated in a counterclockwise direction (first direction), the serrated feet of the dog are engaged with the serrated locking bar (optionally disengaged by rotating the dog in a clockwise second direction). In an embodiment, when the dog is rotated in a counterclockwise direction, the serrated feet of the dog are disengaged from the serrated locking bar. In another embodiment, when the dog is rotated in a clockwise direction, the serrated feet of the dog are engaged with the serrated locking bar. Optionally, when the dog is rotated in a clockwise direction, the serrated feet of the dog are disengaged from the serrated locking bar.

The releasable connector mechanism optionally comprises a locking cam in the first plate and a cam screw, a cam post or a cam slot contained in the second plate, wherein the locking cam is engageable with the cam screw, post or slot. The locking cam optionally further comprises a magnet. The cam is optionally rotatable by a magnetic field from an external apparatus. The first plate optionally comprises a worm gear comprising a diametrically magnetized cylindrical magnet and worm gear teeth, wherein the cam gear has outer teeth which are engageable with the worm gear teeth. Optionally one or more intermediate gears interconnect the worm gear and the cam. The guided bone plate optionally further comprises anchors coupled to the attachment portion. The anchors are optionally screws, staple tines, or pins.

Optionally each of the at least two plate segments comprise rails to constrain the plate segments axially. The at least two plate segments optionally comprise a mortise and tenon system and/or a hole and insert system to constrain the movement of the plate segments.

Optionally there is a hinge between two or more of the at least two plate segments. The hinge allows the at least two connected plate segments attached to bone, wherein the connected plate segments are releasably locked in fixed, spaced apart relation not along a longitudinal axis and the plate tethers the physis to reduce physeal bone growth, optionally wherein the guided bone plate is any of the guided bone plates of the disclosure. Optionally the releasable connector mechanism is incorporated within the hinge.

Another embodiment relates to a bone plate system or kit for reducing longitudinal bone growth, comprising:
- a guided bone growth plate of the disclosure;
- an extracorporeal actuator for unlocking the guided bone growth plate from a locked position, the extracorporeal actuator comprising a magnet or an electromagnet for applying magnetic force to actuate the magnetically responsive driver associated with the connector mechanism while the extracorporeal actuator and magnetically responsive driver are spaced apart, the actuation of the driver causing the locking surface to disengage from the engagement surface, thereby actuating the lock from the locked position to the unlocked position.

The extracorporeal actuator is optionally configured for transcutaneously unlocking the guided bone growth plate. The plate is optionally an Eight Plate, an H Plate, or any of the guided bone plates of the disclosure.

The bone plate system (kit) is also useful in methods of the disclosure. Another aspect of the disclosure relates to a method for tethering the physis of a subject for guided bone growth, comprising attaching a guided bone growth plate to a subject, the plate comprising at least two connected plate segments attached to bone, wherein the connected plate segments are releasably locked in fixed, spaced apart relation along a longitudinal axis and the plate tethers the physis to reduce physeal bone growth, optionally wherein the guided bone plate is any of the guided bone plates of the disclosure.

The method optionally further comprises unlocking the plate segments so that the plate segments are disconnected and permitted to move apart along the longitudinal axis in response to physeal bone growth. The unlocking step optionally comprises applying a magnetic force to unlock the plate segments. The magnetic force optionally causes i) rotation of a pin or a screw such to cause withdrawal of the pin or the screw from the plate segments; ii) rotation of a worm gear to cause a locking surface to disengage from an engagement surface; iii) rotation of a cam to cause it to disengage from the cam screw, post or slot; or iv) movement of a dog to cause its feet to disengage from a serrated locking bar or to engage with a serrated locking bar.

The magnetic force is optionally time-variant. The magnetic force is optionally generated by an unlocking actuator tool.

Another aspect of the disclosure relates to use of the guided bone growth plate of the disclosure or the system of the disclosure, for tethering the physis of a subject for guided bone growth. Another aspect relates to use of the guided bone growth plate or the system of the disclosure, for correction of angular bone deformities and/or a limb length discrepancy in a subject. The device is useful for treatment of a subject that has a skeletal immaturity. The guided bone growth plate or the system is optionally useful for treatment of a subject having valgus, varus or flexion, extension deformities of the knee (femur and/or tibia); valgus, varus, or plantar flexion deformities of the ankle; valgus or varus deformities of the elbow (humerus); and radial or ulnar deviation, flexion or extension deformities of the wrist (radius). The bone is optionally a femur, a tibia, an ankle, an elbow (humerus) or a wrist (radius). Another aspect relates to use of the guided bone growth

BRIEF DESCRIPTION OF THE DRAWINGS

Certain embodiments of the disclosure are described by reference to the following non-limited examples.

As shown in FIG. 2B, the locking screw (140) is aligned orthogonally with the guided growth device.

In FIG. 3, the locking screw (240) is aligned axially with the device. The locking screw and magnet are integral. When the screw (240) traverses both 210 and 220, the device is locked. When the screw (240) does not traverse 210 and 220, the device is unlocked. The locking screw (240) contains an integral magnet (not illustrated). An external actuator tool is used to produce a rotating magnetic field which causes the magnet to rotate, and since the locking screw (240) and the magnet are integral, so does the locking screw (240) also rotate. By rotating in one direction the locking screw (240) withdraws from 210. When 240 is no longer threaded into 210 the device is unlocked.

FIG. 4A shows a side view and FIG. 4B shows a top view of an alternate embodiment of the device in which the locking screw (340) and the cylindrical magnet (350) are separate components not integrated. Separating the magnet from the locking screw may have cost, performance and manufacturability advantages. In this embodiment of the disclosure, the head of the cylindrical magnet (350) and the head of the locking screw (340) are shaped such that they engage, such that when the magnet rotates it causes the screw to rotate in the same direction. In this embodiment, a spring (360) may be used to maintain contact between the heads of the cylindrical magnet (350) and the locking screw (340).

FIGS. 7A-C depict a way by which the device can be made stronger.

FIG. 9A shows a side view of the device and FIG. 9B shows a top view of an embodiment of the disclosure having a direct locking cam mechanism.

In FIG. 11, the series of gears (1030, 1035 and 1040) and the locking cam (1010) are contained within one half of the guided growth device, while the cam screw (1020) is integral with the other half. When the locking cam (1010) 'grabs' the head of the cam screw (1020), the device is locked. When the locking cam (1010) does not grab the head of the cam screw (1020), the device is unlocked. A cylindrical magnet is embedded within the worm gear (1040). An external actuator tool is used to produce a rotating magnetic field which causes the worm gear (1040) to rotate, and since the locking cam (1010) and the worm gear (1040) are connected by the intermediate gear (1030), so does the locking cam (1010) also rotate albeit at a much lower rate. By rotating in one direction the locking cam (1010) 'grabs' 1020 and locks the device. On the other hand, when rotating in the opposite direction, the locking cam (1010) releases the cam screw (1020) unlocking the device. The rotating field produced by the external actuator tool is a non-invasive means to cause the locking cam to release the head of the cam screw, as such the guided growth device can be unlocked by this non-invasive, non-surgical, transcutaneous method. Once unlocked, growth is no longer constrained. The two halves of the device remain implanted, possibly in perpetuity requiring no surgery to remove.

DETAILED DESCRIPTION

Figure 1A:
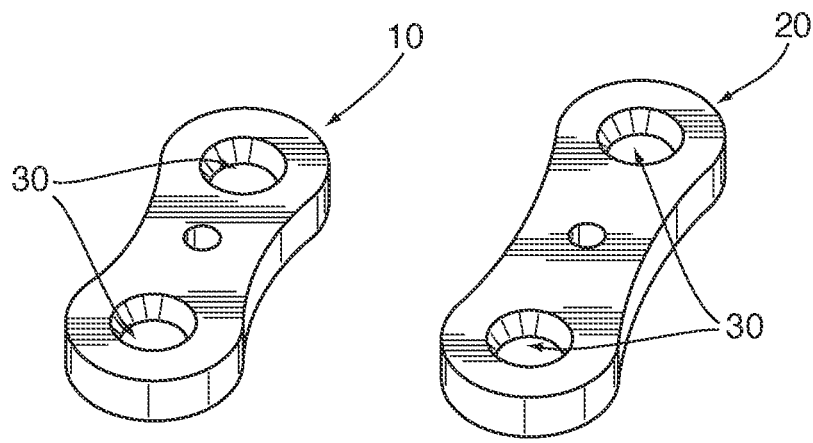
FIG. 1A shows an "Eight Plate"
Figure 1B:
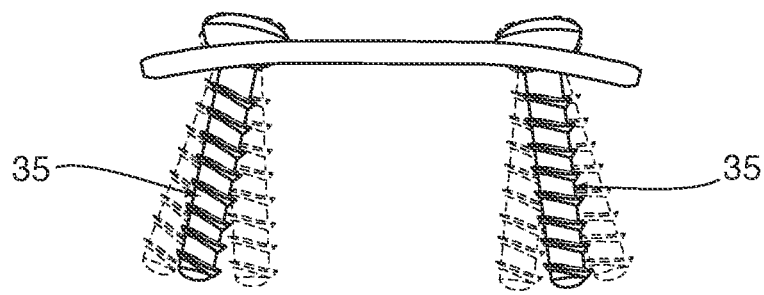
FIG. 1B shows an eight plate with fasteners.
Figure 1C:
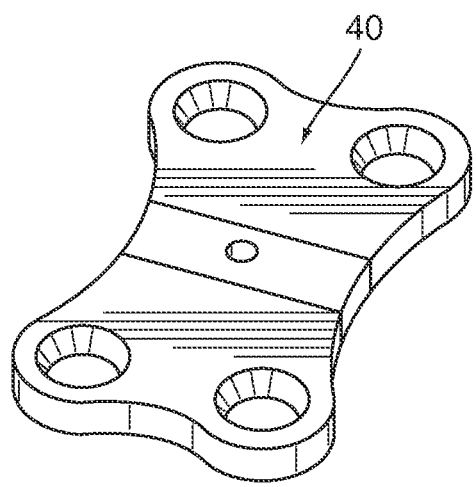
FIG. 1C shows an "H Plate". These are examples of guided growth devices which are prior art.

FIGS. 1A-C provide examples of guided growth devices which are prior art. In certain embodiments, our guided growth device similarly relies on screws inserted through tapered holes into the patient's bone. In the other Figures of this application we illustrate a guided growth device having two such screw holes similar to the Eight Plate. The present disclosure includes variations of our device having more than two screws, including a version having four similar to the "H Plate".

Turning to the present invention, in one embodiment, the implanted device comprises a physeal tethering device, consisting of two pieces locked or pinned together (110 and 120). Each of the two pieces is anchored into bone using screws, optionally staple tines, optionally pins (35). The locking mechanism utilizes a pin, screw, or other fastening element which, when in one position or orientation, prevents the two pieces from separating, while when in a different position or orientation the two pieces may freely separate, allowing for the resumption of normal growth. 140 is a pin that traverses concentric holes in 110 and 120. When the pin (140) is withdrawn so that it no longer traverses 120, 110 may slide over the top of 120, the two halves being no longer pinned together. The two halves (110 and 120) are constrained by rails (125) to only slide axially, hence when the pin (140) is installed the two halves cannot move at all. While in FIG. 2B we illustrate the pin (140) as a screw, in principle any pin which traverses 110 and 120 serves to lock the two halves.

Figure 2A:
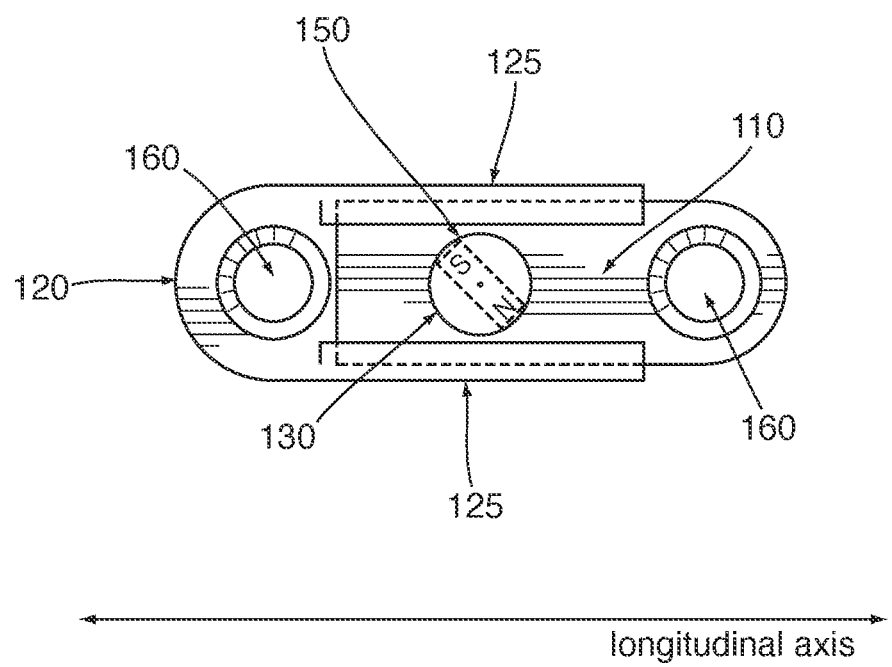
FIG. 2A shows a top view and FIG. 2B shows a side view of a guided growth device consisting of two pieces (110 and 120), each having a threaded thru hole (130) into which a locking screw (140) is inserted. When the screw (140) traverses both 110 and 120, the device is locked. When the screw (140) does not traverse 110 and 120, the device is unlocked. The locking screw (140) contains an integral magnet (150). An external actuator tool is used to produce a rotating magnetic field which causes the magnet (150) to rotate, and since the locking screw (140) and the magnet (150) are integral, so does the locking screw (140) also rotate. By rotating in one direction, the locking screw (140) withdraws from 120. When 140 is no longer threaded into 120, the device is unlocked. The rotating magnetic field produced by an external actuator tool is a non-invasive means to cause the lock screw to withdraw, thus unlocking the guided growth device transcutaneously. Once unlocked, growth is no longer constrained. The two halves of the device remain implanted, possibly in perpetuity, requiring no surgery to remove.
Figure 2B:
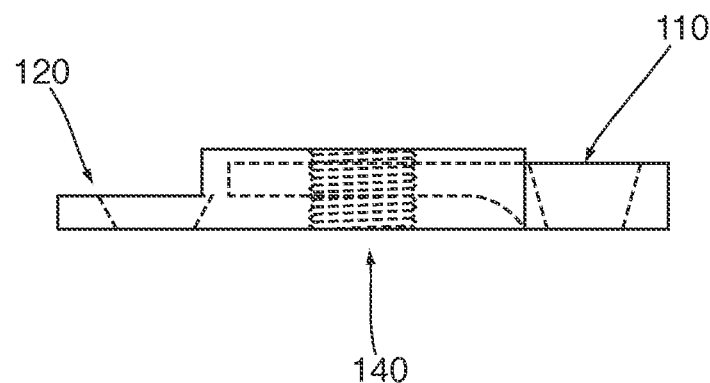

An important component of the disclosure is the incorporation of an element in the implanted device which may be manipulated by an external magnetic field. In one embodiment illustrated in FIGS. 2A and 2B, this element is a magnet (150) incorporated within the locking pin (140). In this embodiment, the magnetic poles of the magnet (150) lie in the same plane as 110 and 120, thus when an external magnetic field is introduced it causes rotation of the pin (140) as is necessary to withdraw a screw. An optional embodiment of the device illustrated in FIG. 2 is a screw (140) incorporating a magnet (150), the magnet being cylindrical and approximately the same diameter and length as 140, and diametrically polarized.

An alternative optional embodiment (not illustrated) is a magnet (150) with magnetic poles oriented orthogonal to the plane of 110 and 120 (axially polarized). Imagine neither the pin (140) nor the concentric holes (130) are threaded but rather are smooth. In such an embodiment, an external magnetic field could simply 'pull' the pin (140) out of the holes (130) thus unlocking the device.

Optional embodiments of the disclosure have the external magnetic field as time-variant in a specific manner in order to unlock the device to avoid accidental or incidental unlocking. Whereas in the embodiment described in the preceding paragraph any sufficiently strong static external magnet—as may be encountered in daily life-could cause the pin to withdraw, the pin (140) shown in FIG. 2B is in fact a screw which needs to be rotated several times in order to withdraw from 120 unlocking the device. Only a very specific external rotating magnetic field when brought within close proximity to the implanted device can cause 140 to rotate in this prescribed manner.

Optional embodiments incorporate a screw (140) which needs to be rotated through several full rotations in order to withdraw from 120. While even a screw requiring just a partial rotation complies with the desire to avoid accidental unlocking as may be caused by interaction with incidental magnetic fields as described in the preceding paragraph, a screw which requires multiple rotations to withdraw requires lower force to withdraw possibly making the system easier to implement.

Figure 3:
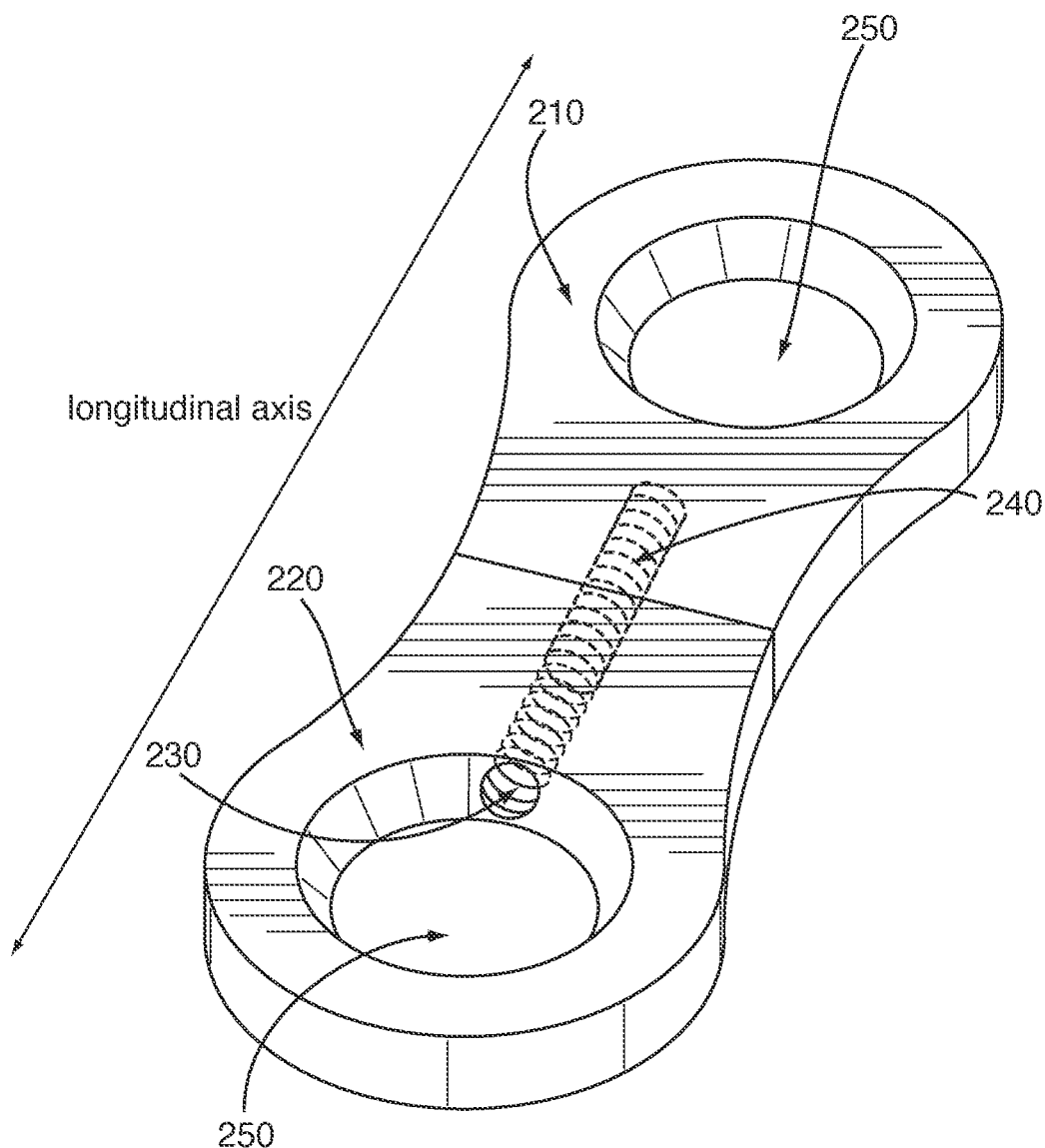
FIG. 3 shows an alternate embodiment of the device.

An alternate embodiment utilizes an axial screw (240). The device in FIG. 3 could incorporate similar rails (125) as illustrated in FIG. 2 constraining the two halves to only slide axially. When the screw (240) is inserted into 210, 210 and 220 are locked to one another, whereas when 240 is withdrawn into 220, and no longer traverses 210, the two halves may then separate axially. In an optional embodiment, the screw (240) incorporates a diametrically polarized cylindrical magnet that is approximately the same length and diameter as the screw itself. An external rotating magnetic field produced by the unlocking actuator tool, which is a further component of this disclosure, causes the screw (240) to withdraw unlocking the device.

An alternate embodiment separates the element which may be manipulated by an external magnetic field from the locking element. As shown in FIG. 4A, the component which may be manipulated by an external magnetic field is a diametrically polarized cylindrical magnet (350), and it is separate from the locking screw (340). One reason to separate the two is to unconstrain the rotation of the cylindrical magnet reducing the probability that the screw can become 'stuck'. As shown in FIG. 4A, the heads of 350 and 340 mate with one another, but not tightly, thus 350 can move through a partial rotation before banging into 340. The ability to move through a partial rotation before banging the head of the locking screw (340) enables the cylindrical magnet (350) to act like a 'hammer' screwdriver and may be a more effective means to withdraw 340 from 310.

Figure 5:
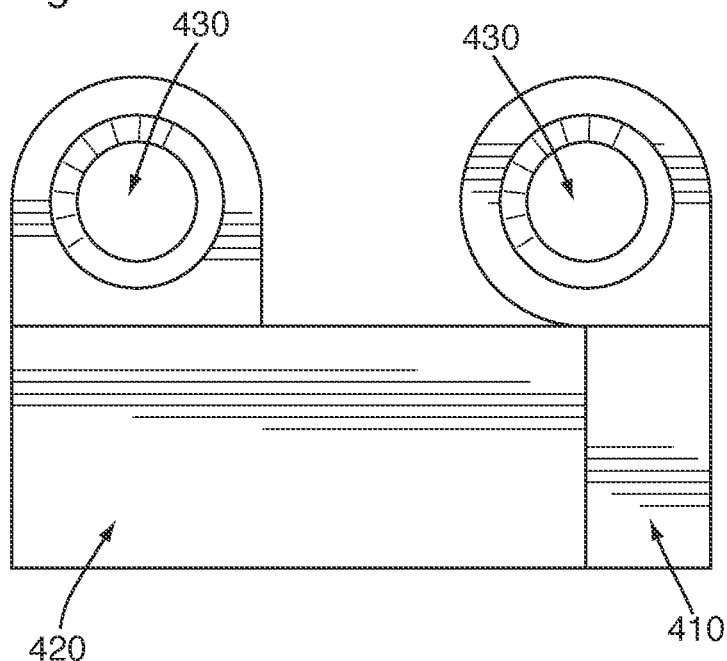
FIG. 5 shows a plate with tapered screw holes (430) that are located on one side of the device.
Figure 6:
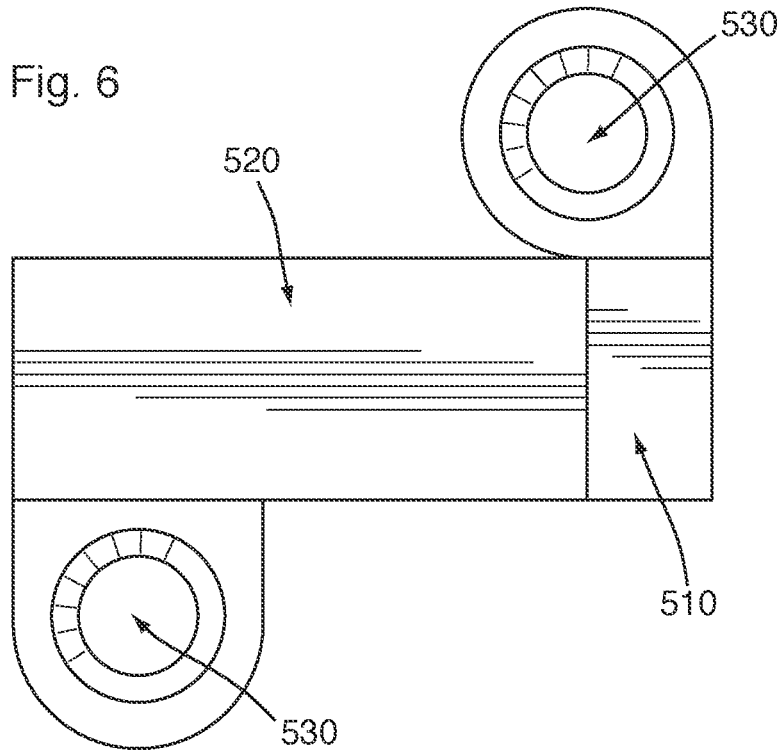
FIG. 6 shows a plate with tapered screw holes (430) that are situated on opposite sides.

FIG. 5 shows a plate with tapered screw holes (430) that are located on one side of the device. FIG. 6 shows a plate with tapered screw holes (430) that are situated on opposite sides. By situating the tapered screw holes on the sides, the device is made shorter. Whereas in FIGS. 2-4, the tapered screw holes are shown positioned axially at either end of the guided growth device, they may alternatively be situated on the side of the device as illustrated in FIGS. 5 and 6.

An alternative embodiment uses a mortise and tenon system (630), or a hole and insert system, or both, to both strengthen the locked device and constrain the movement of the two halves (610 and 620) to axial movement. Indeed, any combination of rails (125) and mortises, tenons, inserts and holes (630) may be incorporated in an embodiment.

Figure 7A:
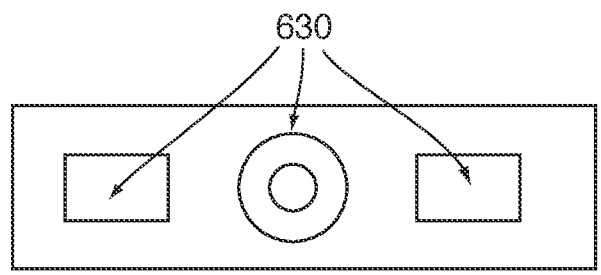
FIG. 7A shows a plate with one or more mortises and tenons and/or an insert (630) lend much greater strength to the joint between the two halves 610 and 620. The insert and/or tenons and mortises (630) relieve strain on the locking screw.
Figure 7B:
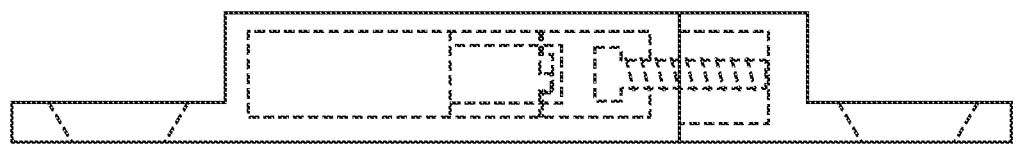
FIG. 7B shows a side view and 7C shows a top view of a plate with a magnet holder (650) and screw head holder (640) which are interlocked; they cannot be separated axially. However, 650 can rotate freely for a partial rotation. Because it can rotate freely before hitting the screw head holder, the magnet holder can be used as a hammer which may be a more effective technique for withdrawing the screw from 610. Also, because 640 and 650 are interlocked and cannot be separated axially, there is no need for the spring illustrated in the alternate embodiment illustrated in FIG. 4, which is a simplification and also means the device can be made shorter.
Figure 7C:
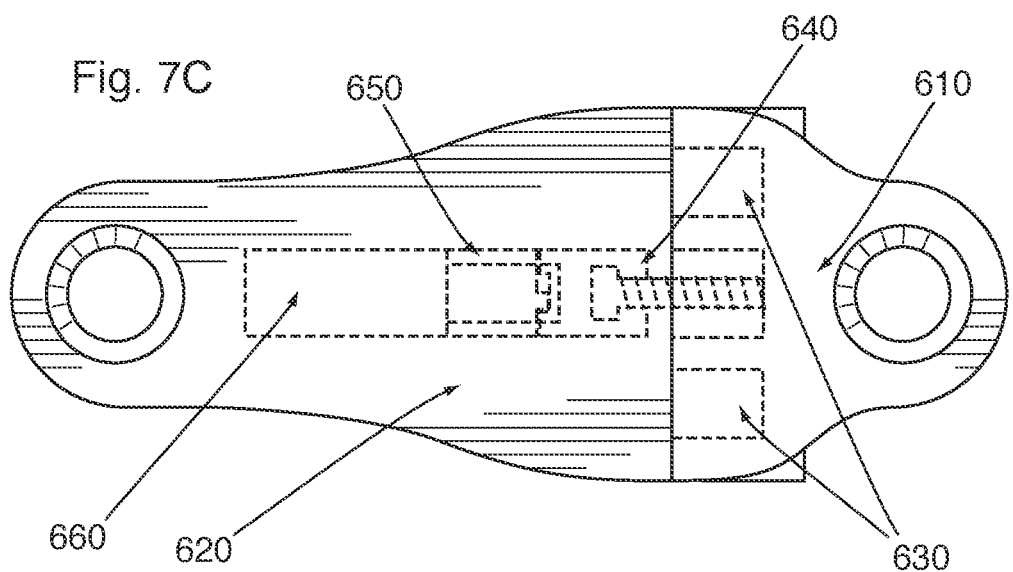

The embodiments in FIGS. 7A-C do not include a spring (360) which is shown in FIG. 4A. The cylindrical magnet holder (650) and the screw head holder (640) are linked in such a way that they cannot separate axially, and yet 650 may travel through a partial rotation before banging into 640 thus enabling the same hammer action as described in preceding paragraphs.

Figure 8:
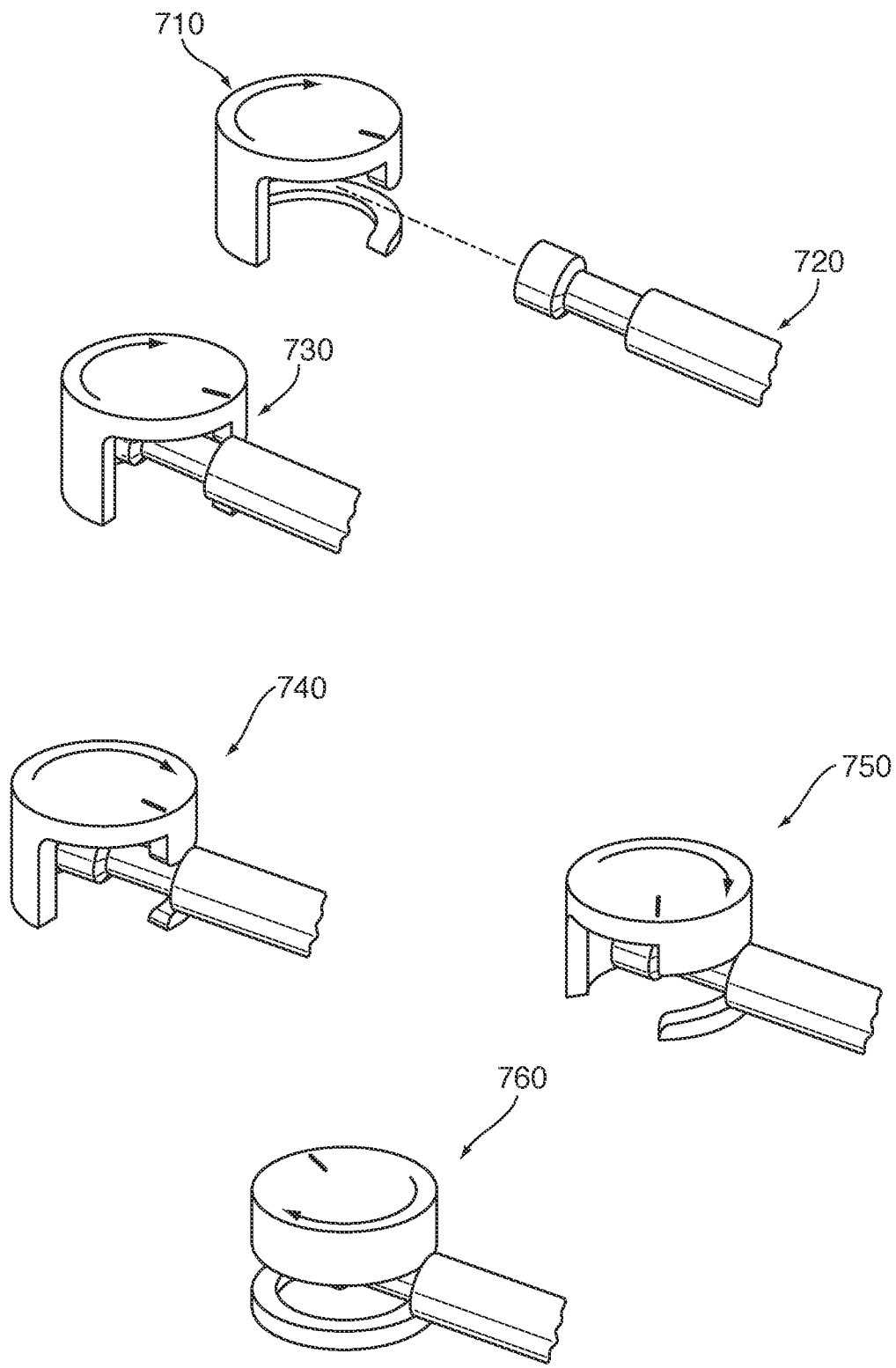
FIG. 8 illustrates prior art items, a locking cam (710) and a cam screw (720). By rotating the locking cam (710) it 'grabs' the head of the cam screw (720); further rotating 710 locks the cam onto the screw head. We optionally incorporate a similar mechanism in the embodiments illustrated in FIGS. 9-11.

An alternative embodiment utilizes a locking cam (710) to grab the head of a cam post (720). Locking camps are generally known in the art (FIG. 8). In a simple implementation, the locking cam (710) might incorporate a diametrically polarized magnet similar to (150), thus a partial rotation of the cam (710) releases the head of the cam post (720) unlocking the device. We illustrate an alternate simple implementation in FIGS. 9A and 9B, where the locking cam itself (830) contains within it the magnetic elements (840). When locking cam (830) 'grabs' the cam post (825) the device is locked. When 830 does not grab 825 the device is unlocked. In this embodiment, the locking cam includes embedded magnets (840). An external actuator tool (860) which produces a rotting magnetic field may be used to transcutaneously rotate the cam unlocking the device.

Figure 10:
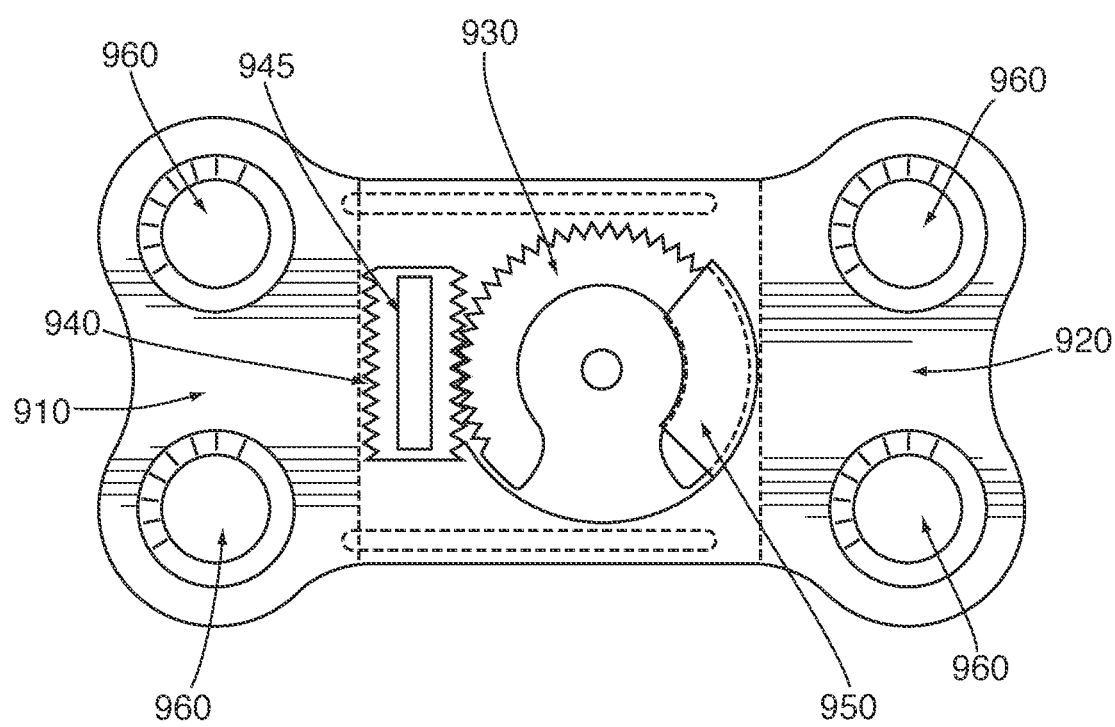
FIG. 10 shows several additional optional features of the device which may be incorporated in alternate embodiments of the disclosure.

In an optional embodiment illustrated in FIG. 10, the magnetic element (945) is contained inside a worm gear (940) rather than in the locking cam (930) itself. One benefit of such an arrangement is mechanical advantage, enabling use of a smaller magnetic element. Worm gear 940 has a diametrically magnetized cylindrical magnet (945) inside. When 940 rotates, its teeth, which match the teeth on the outer edge of the locking cam (930), cause the locking cam to rotate. Since the locking cam (930) rotates by a distance equal to the pitch of one of its teeth for every rotation of the worm gear (940), this embodiment features mechanical advantage enabling use of a weaker magnet. FIG. 10 also features a slot (950) into which the locking cam (930) inserts to lock the device, and from which the locking cam is withdrawn to unlock the device. The slot (950) is an alternative to the post (825). In FIG. 10 we also note that in alternate embodiments of the disclosure the device may be bendable to allow a closer fit of the device to the bone. We also illustrate a tongue and groove arrangement of the two halves 910 and 920 as a means of both constraining the motion of the device to axial movement and as a means of making the locked device stronger.

Figure 11:
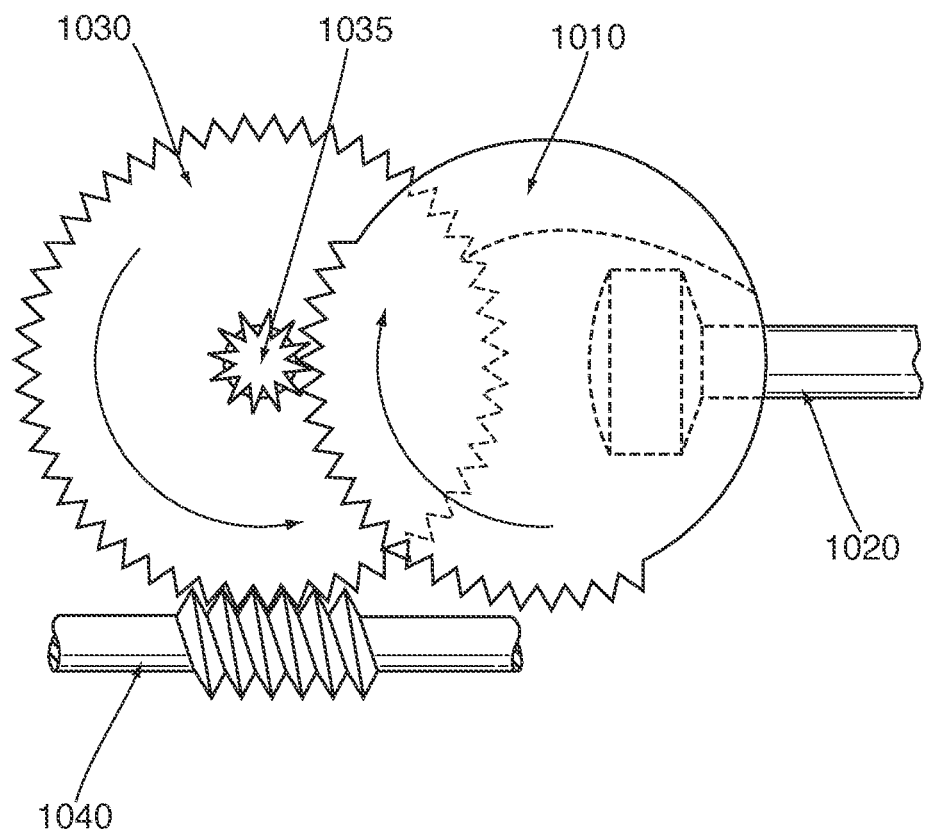
FIG. 11 shows an embodiment of the device having significant mechanical advantage involving a series of gears. In this embodiment, a series of gears enable the guided growth device to be unlocked with a much lower applied force enabling a small magnet to be utilized.

In the optional embodiment illustrated in FIG. 11, the magnetic component is a diametrically polarized cylindrical magnet inside the worm gear (1040). In this embodiment, the worm gear (1040) needs to rotate through many rotations (in one embodiment, 160 rotations) in order to slowly rotate the intermediate gear (1030) and, in turn, even more slowly rotate the locking cam (1010) to release the head of the cam post (1020). The embodiment illustrated in FIG. 11 would be incorporated within a device such as those illustrated in FIG. 3, FIG. 4 or FIG. 7, among others. The merit of the worm gear plus intermediate gear arrangement is high mechanical advantage meaning a relatively low applied external force can be used to unlock the device, and yet the applied external force needs to be a precisely applied rotating magnetic field so there is no chance that the device may accidentally unlock caused by incidental exposure to a magnetic field. Other embodiments utilize alternate arrangements of gears linking a rotating magnetic component inside the device to a locking element also inside the device.

In FIG. 9 we show an embodiment where magnets (840) are directly integrated within the locking cam (830). Alternatively, in FIG. 10 we show an embodiment where the magnetic element (945) is incorporated within a worm gear (940), and in FIG. 11 there is an intermediate gear (1030) in between the worm gear (1040) and the locking cam (1010). In other embodiments, alternate arrangements of gears may be used to build-in sufficient mechanical advantage such that a small magnetic element is sufficient to enable unlocking utilizing an external actuator tool which produces a rotating magnetic field.

Figure 12:
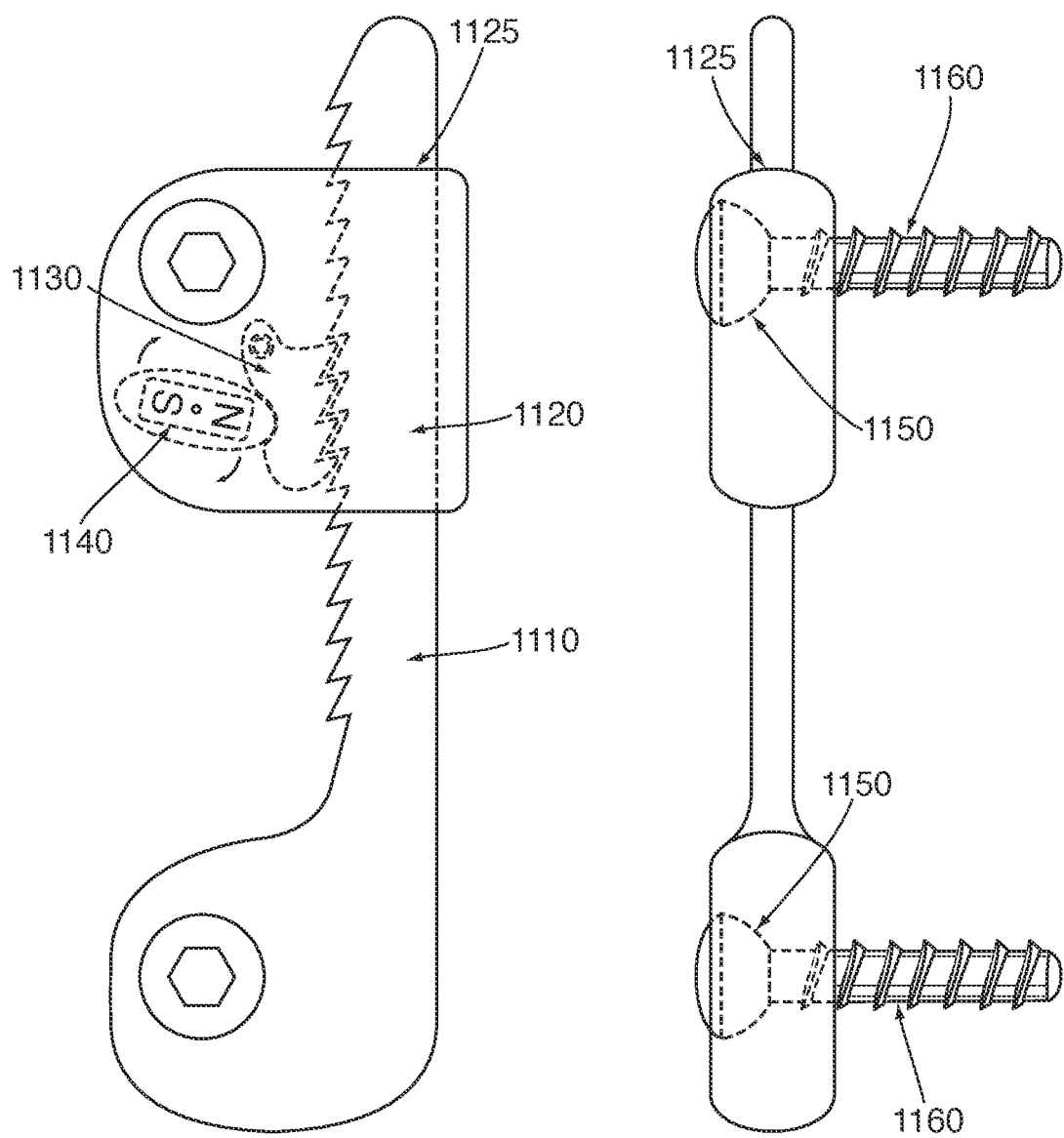
FIG. 12 shows an embodiment wherein a serrated locking bar (1110, also 1230) inserted through a housing (1120, also 1260) is locked by a 'dog' (1130, also 1210) having serrated feet which engage with the bar (1110, also 1230). An oblong locking mechanism (1140, also 1220) contains a magnet (1225). The dog (1130, also 1210) is anchored by a torsion spring and fulcrum (1250). When an external actuator tool is used to rotate the magnet (1225), so does the locking mechanism (1220) rotate, and due to force of the torsional spring (1250) the dog's feet disengage from the locking bar (1110, also 1230), thus unlocking the device. Clockwise rotation of 1220 unlocks the device while counterclockwise rotation locks the device. One feature of this embodiment is that the device can be both unlocked and locked in-situ using an external actuator tool which produces a rotating magnetic field that causes the locking mechanism (1220) to rotate.
Figure 13:
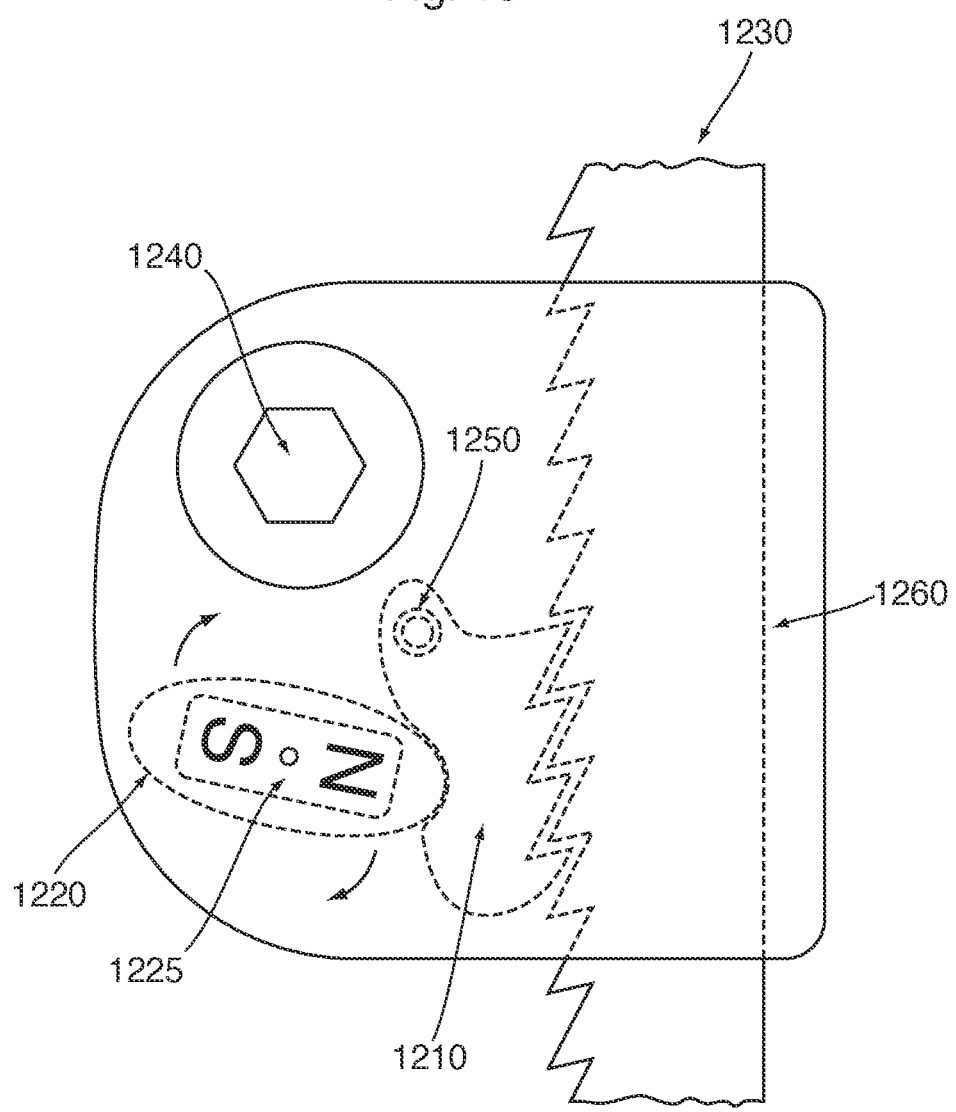
FIG. 13 shows an embodiment wherein a serrated locking bar (1110, also 1230) inserted through a housing (1120, also 1260) is locked by a 'dog' (1130, also 1210) having serrated feet which engage with the bar (1110, also 1230).
Figure 14:
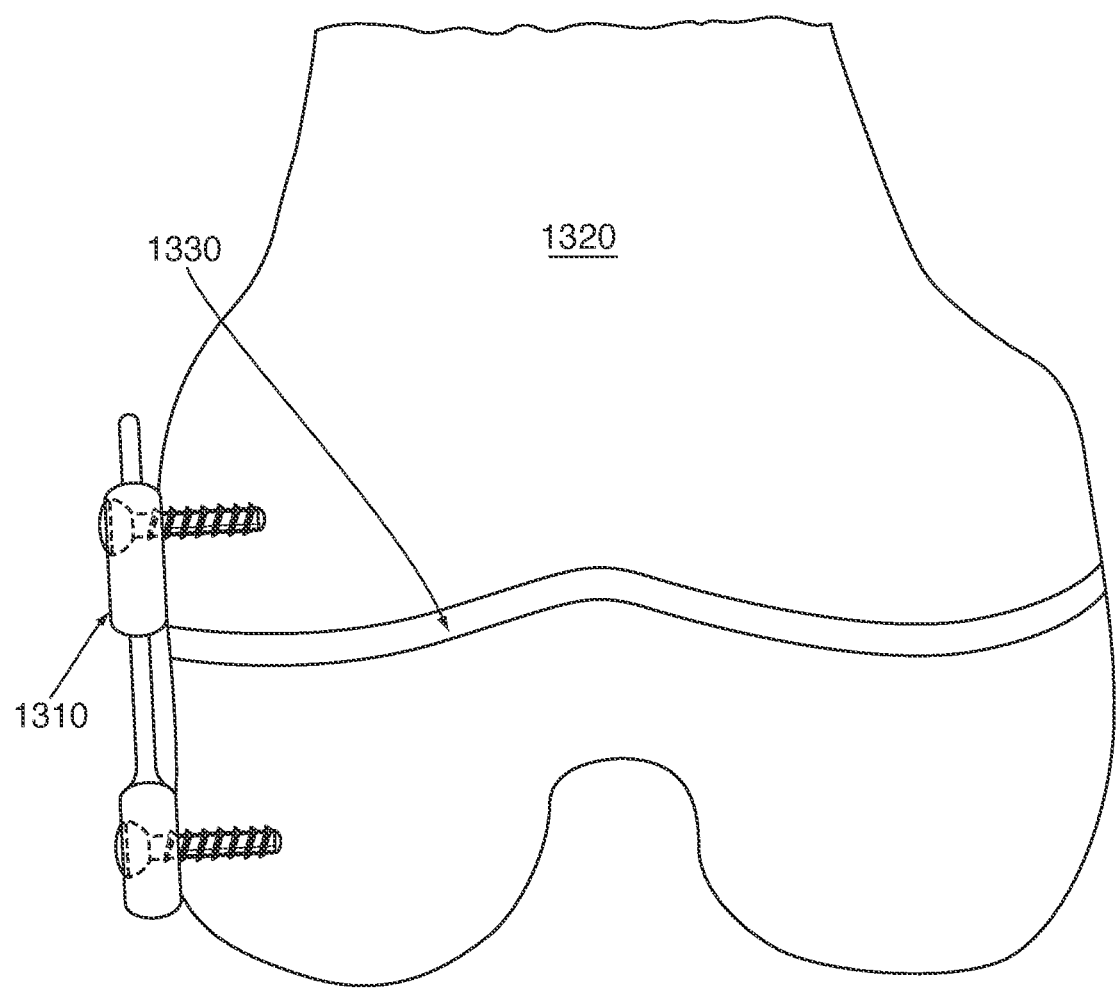
FIG. 14 shows the embodiment of the disclosure in FIGS. 12 and 13 tethering the distal femoral physis.

An alternative embodiment enables transcutaneous locking as well as unlocking. When the magnetic release component (1140, 1220), within the embodiment illustrated in FIGS. 12 and 13, is rotated clockwise, the device is unlocked; the locking bar (1230) is free to slide within the housing (1260). On the other hand, when the magnetic release component (1140, 1220) is rotated counterclockwise, the serrated feet of the 'dog (1130, 1210) engage with the serrated edge of the locking bar (1230) locking the device. FIG. 14 shows the embodiment of the disclosure in FIGS. 12 and 13 tethering the distal femoral physis. Any of the embodiments described in this disclosure could similarly be implanted.

Figure 15:
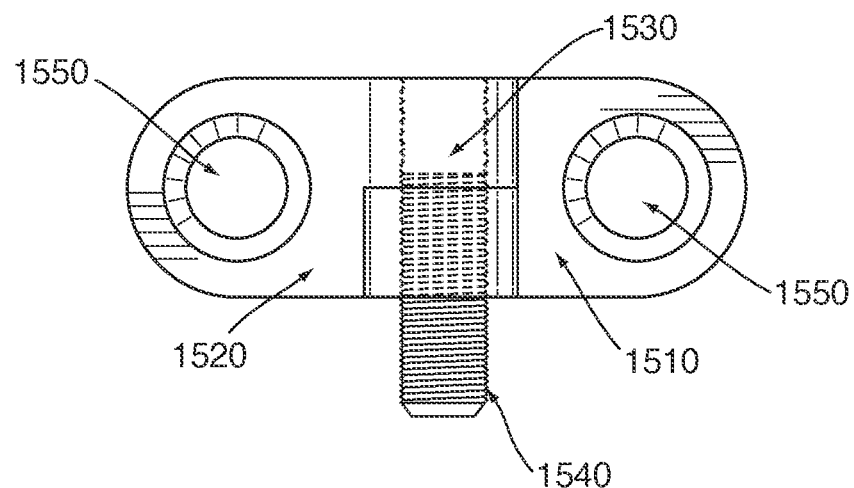
FIG. 15 shows a device embodiment wherein the device is hinged.
Figure 15:
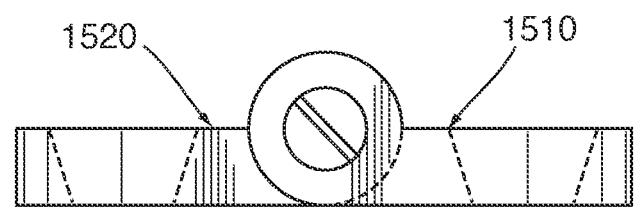
Figure 15:
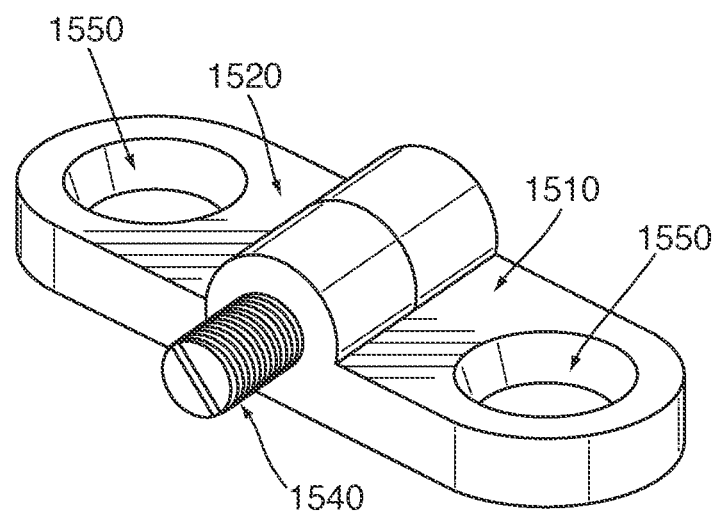

An alternative embodiment utilizes a hinge between two or more of the at least two plate segments. When any two segments such as 1510 and 1520 are connected by a pin such as 1540 then the two segments together form a hinge. When the device is hinged it can bend enabling a closer fit of the device to the bone. In alternative embodiments, as in FIG. 15, the pin 1540 not only optionally connects the two halves in such a way that they may hinge, it also serves as the releasable connector mechanism, since when pin 1540 traverses through hole 1530 the two halves 1510 and 1520 are locked together although not along a longitudinal axis, while when 1540 does not traverse through hole 1530 the two halves are unlocked. Other suitable hinges will be readily apparent from the disclosure.

Other variations of the embodiments described in this disclosure will be readily apparent.

The invention claimed is:

1. A guided bone growth plate configured for tethering the physis of a subject, comprising at least two plate segments, each plate segment attachable to bone;
the guided bone growth plate having
(i) a locked position in which the plate segments are connected by a connector mechanism so that the plate segments are in a fixed, spaced apart relation to one another along a longitudinal axis, the plate segments configured for tethering the physis to reduce physeal bone growth; and
(ii) an unlocked position in which the plate segments are fully disconnected such that the plate segments are configured to move apart along the longitudinal axis only in response to bone growth;
a magnetically responsive driver on at least one of the plate segments, the driver capable of being actuated by application of magnetic force to the driver to disconnect the connector mechanism to change the plate from the locked position to the unlocked position.

2. The guided bone plate of claim 1, wherein the magnetically responsive driver is located within the connector mechanism.

3. The guided bone plate of claim 1, wherein the magnetically responsive driver comprises: i) a worm gear and/or ii) one or more intermediate gears; the driver capable of being actuated by application of magnetic force to the driver, the actuation of the driver actuating the worm gear or the one or more intermediate gears, causing the locking surface to disengage from the engagement surface, thereby actuating the lock from the locked position to the unlocked position.

4. The guided bone plate of claim 1, wherein the plate segments comprise a first plate segment and a second plate segment.

5. The guided bone plate of claim 1, wherein the releasable connector mechanism comprises a serrated locking bar and a dog comprising serrated feet contained in the first plate, wherein the serrated feet of the dog are engageable with the serrated locking bar.

6. The guided bone plate of claim 5, wherein the dog is anchored by a torsion spring and a fulcrum, optionally wherein the dog is rotatable by a magnetic field from an external apparatus.

7. The guided bone plate of claim 6, wherein: i) when the dog is rotated in a first direction, the serrated feet of the dog are engaged with the serrated locking bar, and when the dog is rotated in a second direction, the serrated feed of the dog are disengaged from the serrated locking bar, optionally wherein when the dog is rotated in a clockwise direction, the serrated feet of the dog are disengaged from the serrated locking bar.

8. A bone plate system for reducing longitudinal bone growth, comprising:
a guided bone growth plate;
an extracorporeal actuator for unlocking the guided bone growth plate from a locked position, the extracorporeal actuator comprising a magnet or an electromagnet for applying magnetic force to actuate the magnetically responsive driver associated with the connector mechanism while the extracorporeal actuator and magnetically responsive driver are spaced apart, the actuation of the driver causing the locking surface to disengage from the engagement surface, thereby actuating the lock from the locked position to the unlocked position, optionally wherein the guided bone plate is the guided bone growth plate of claim 1.

9. A method for tethering the physis of a subject for guided bone growth, comprising
attaching a guided bone growth plate to a subject, the plate comprising at least two connected plate segments attached to bone, wherein the connected plate segments are releasably locked in fixed, spaced apart relation along a longitudinal axis and the plate tethers the physis to reduce physeal bone growth, optionally wherein the guided bone plate is the guided bone plate of claim 1.

10. A guided bone growth plate configured for tethering the physis of a subject, comprising at least two plate segments, each plate segment having a bone contact surface and an attachment portion configured for attachment of each plate to bone;
a releasable connector mechanism associated with the plate segments that releasably connects and locks the plate segments together, the connector mechanism comprising:
an engagement surface on at least one of the plate segments;
a lock having at least one locking surface corresponding to an engagement surface, the lock having a locked position in which the locking surface engages the corresponding engagement surface so that the plates are connected in a fixed, spaced apart relation relative to one another along a longitudinal axis, and an unlocked position in which the locking surface and the engagement surface are fully disengaged so that the plates are disconnected such that the plate segments are configured to move along the longitudinal axis only in response to bone growth;
a magnetically responsive driver associated with the connector mechanism, the driver capable of being actuated by application of magnetic force to the driver, the actuation of the driver causing the locking surface to disengage from the engagement surface, thereby actuating the lock from the locked position to the unlocked position,
wherein in the locked position, when the bone contact surfaces are configured to contact bone and the bone plate segments are configured to attach to bone at bone attachment sites, the guided bone growth plate is configured to tether the physis and reduces longitudinal bone growth between the attachment sites.

11. The guided bone plate of claim 10, wherein the attachment portion comprises a hole on each plate.

12. The guided bone plate of claim 11, wherein the attachment portion comprises a hole that is configured for receiving an attachment screw or a staple to attach the plate to bone.

13. The guided bone plate of claim 10, wherein the releasable connector mechanism comprises a screw or a pin.

14. The guided bone plate of claim 13, wherein the releasable connector mechanism comprises a screw with first and second ends, the first screw end contained in the first plate, and the second screw end threadably receivable in a respective second screw hole in the second plate.

15. The guided bone plate of claim 14, wherein the first screw end is threadably receivable in a respective first threaded screw hole in the first plate.

16. The guided bone plate of claim 14, wherein the first end of the screw provides a first threaded engagement surface suitable for threadedly engaging the first locking surface of the first threaded screw hole, and second end of the screw provides a second threaded engagement surface suitable for threadedly engaging the second locking surface of the second threaded screw hole.

17. The guided bone plate of claim 13, wherein the driver comprises a magnet integrated within the screw.

18. The guided bone plate of claim 17, wherein the magnet is cylindrical and is approximately the same diameter and length as the screw and is i) diametrically polarized, or ii) axially polarized.

19. The guided bone plate of claim 17, wherein the magnet comprises a negative pole and a positive pole, and wherein the poles are parallel to the at least two plate segments.

20. The guided bone plate of claim 17, wherein the magnet comprises a negative pole and a positive pole, and wherein the poles are oriented orthogonal to the at least two plate segments.

\* \* \* \* \*